(12) United States Patent　　(10) Patent No.: US 9,669,994 B2
Clevenger　　　　　　　　　　　(45) Date of Patent: Jun. 6, 2017

(54) YARD CLEAN-UP TOOLS AND METHODS

(71) Applicant: Charles T. Clevenger, Zeeland, MI (US)

(72) Inventor: Charles T. Clevenger, Zeeland, MI (US)

(73) Assignee: Todd Clevenger, Grand Rapids, MI (US)

( * ) Notice: Subject to any disclaimer, the term of this patent is extended or adjusted under 35 U.S.C. 154(b) by 0 days.

(21) Appl. No.: 14/700,773

(22) Filed: Apr. 30, 2015

(65) Prior Publication Data

US 2015/0314956 A1　Nov. 5, 2015

Related U.S. Application Data

(60) Provisional application No. 61/986,485, filed on Apr. 30, 2014.

(51) Int. Cl.

| | |
|---|---|
| *B65F 1/14* | (2006.01) |
| *B65F 1/00* | (2006.01) |
| *B65F 1/16* | (2006.01) |
| *B60R 13/01* | (2006.01) |
| *B60P 1/64* | (2006.01) |
| *A01G 1/12* | (2006.01) |
| *B65D 88/22* | (2006.01) |

(52) U.S. Cl.
CPC ............... *B65F 1/00* (2013.01); *A01G 1/125* (2013.01); *B60P 1/64* (2013.01); *B60R 13/01* (2013.01); *B65F 1/002* (2013.01); *B65F 1/1405* (2013.01); *B65F 1/1415* (2013.01); *B65F 1/1452* (2013.01); *B65F 1/1615* (2013.01); *B65D 88/22* (2013.01); *B65F 1/1468* (2013.01); *B65F 2240/138* (2013.01)

(58) Field of Classification Search
CPC .... B65F 1/1415; B65F 1/1452; B65F 1/1615; B65F 1/002; B65F 2240/138; B65F 1/00; B65F 1/1405; B65F 1/1468; B60R 13/01; B60P 1/64; B65D 88/22; A01G 1/125
USPC ................... 296/39.1, 39.2; 383/16; 220/772
See application file for complete search history.

(56) References Cited

U.S. PATENT DOCUMENTS

| | | | | |
|---|---|---|---|---|
| 2,803,491 | A * | 8/1957 | Brown ...................... | B60P 1/64 |
| | | | | 105/423 |
| 8,955,898 | B2 * | 2/2015 | Bemis ...................... | B60P 1/64 |
| | | | | 296/39.2 |
| 2013/0020360 | A1 * | 1/2013 | Brunnemer ............ | A01K 97/06 |
| | | | | 224/249 |

* cited by examiner

*Primary Examiner* — Andrew Perreault
(74) *Attorney, Agent, or Firm* — Mitchell Intellectual Property Law, PLLC

(57) ABSTRACT

Knock down yard tools are provided which are made of flexible heavy duty sheet material joined to form a container for handling yard waste. Included are a truck bed carrier container, a skid container, a bagging container and a hand held carrier. In one embodiment, struts are provided which can be readily assembled to and disassembled from the sheet material to help hold the shape of the container. Preferably the struts are collapsible, and most preferably comprise sections held together and biased to assembly by elastic cord. In a preferred embodiment, a collection of such knock down yard tools are provided along with auxiliary tools for manipulating the yard waste and facilitate its placement in the knock down containers. The auxiliary tools include hand scoops a leaf press, and a gripper.

6 Claims, 11 Drawing Sheets

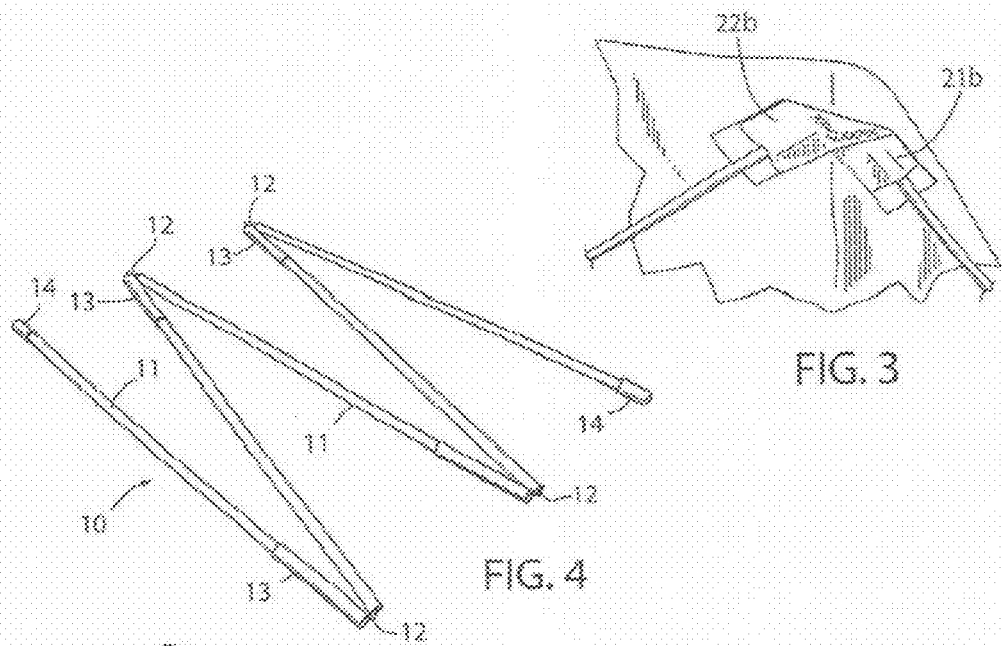
FIG. 3
FIG. 4
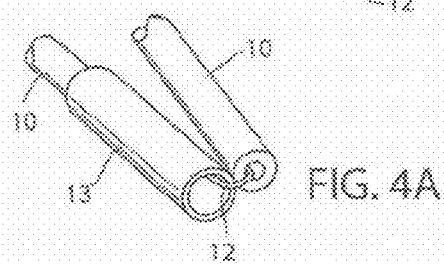
FIG. 4A
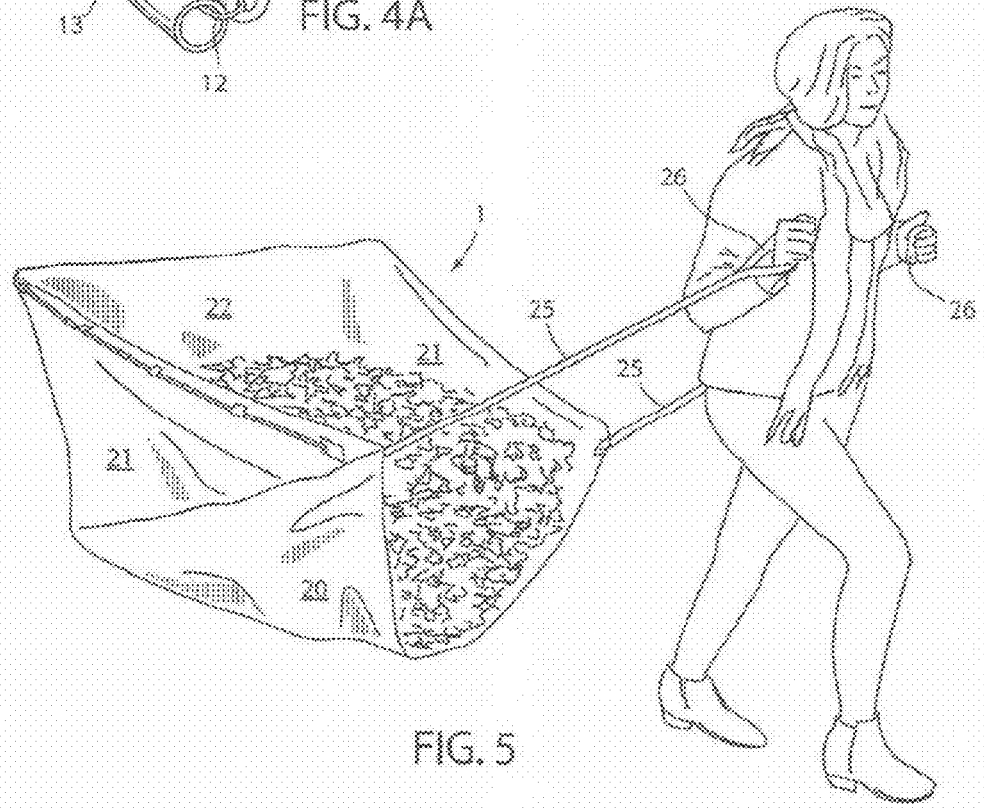
FIG. 5

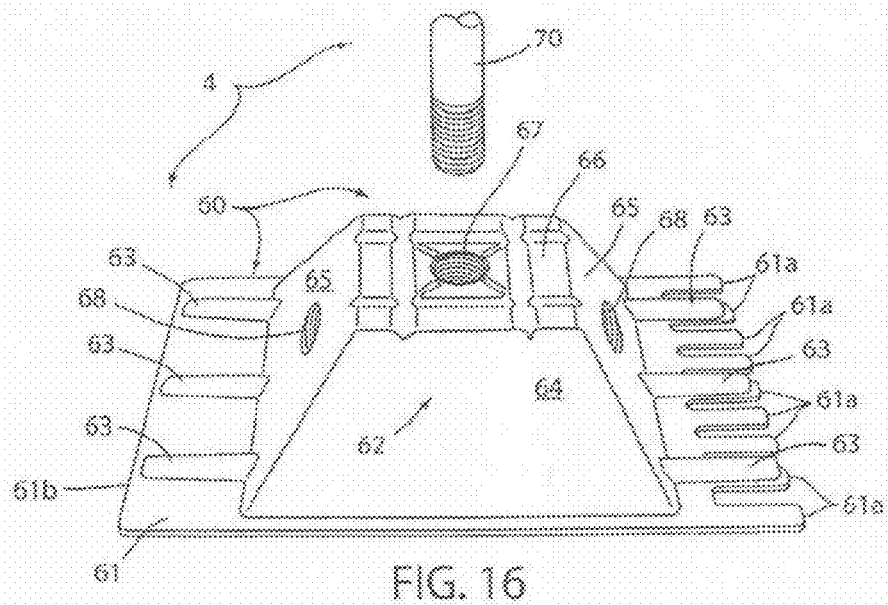
FIG. 16
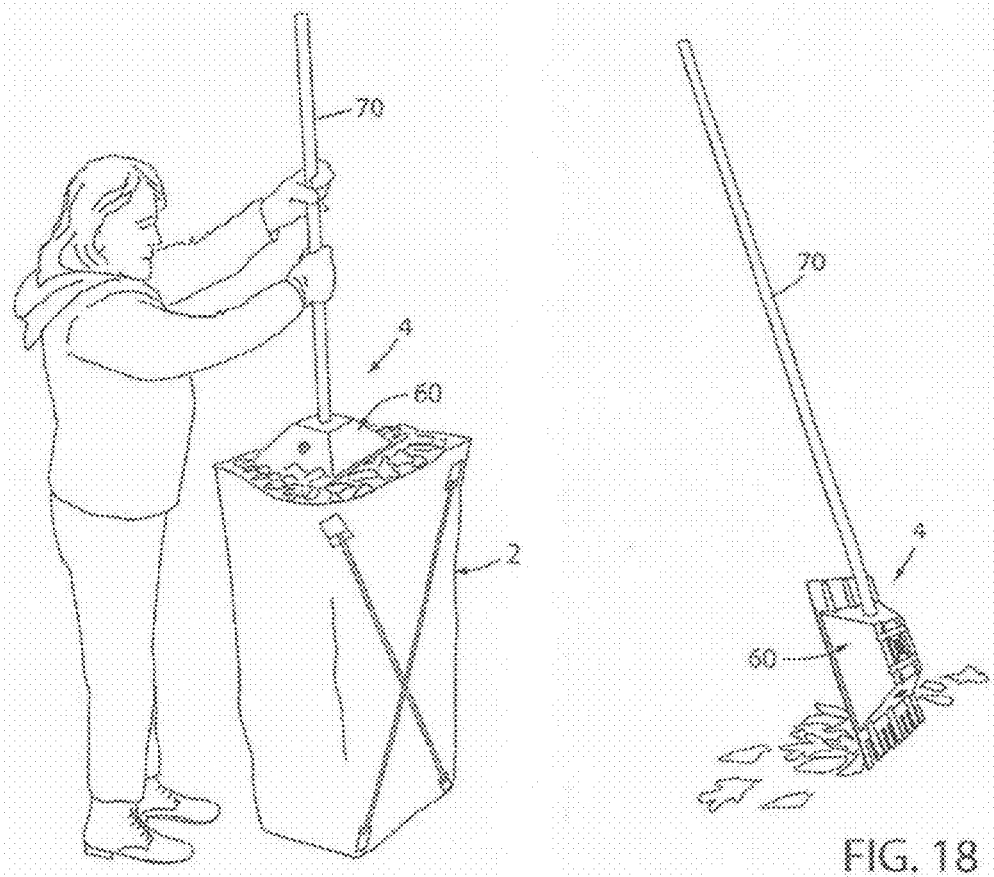
FIG. 17
FIG. 18

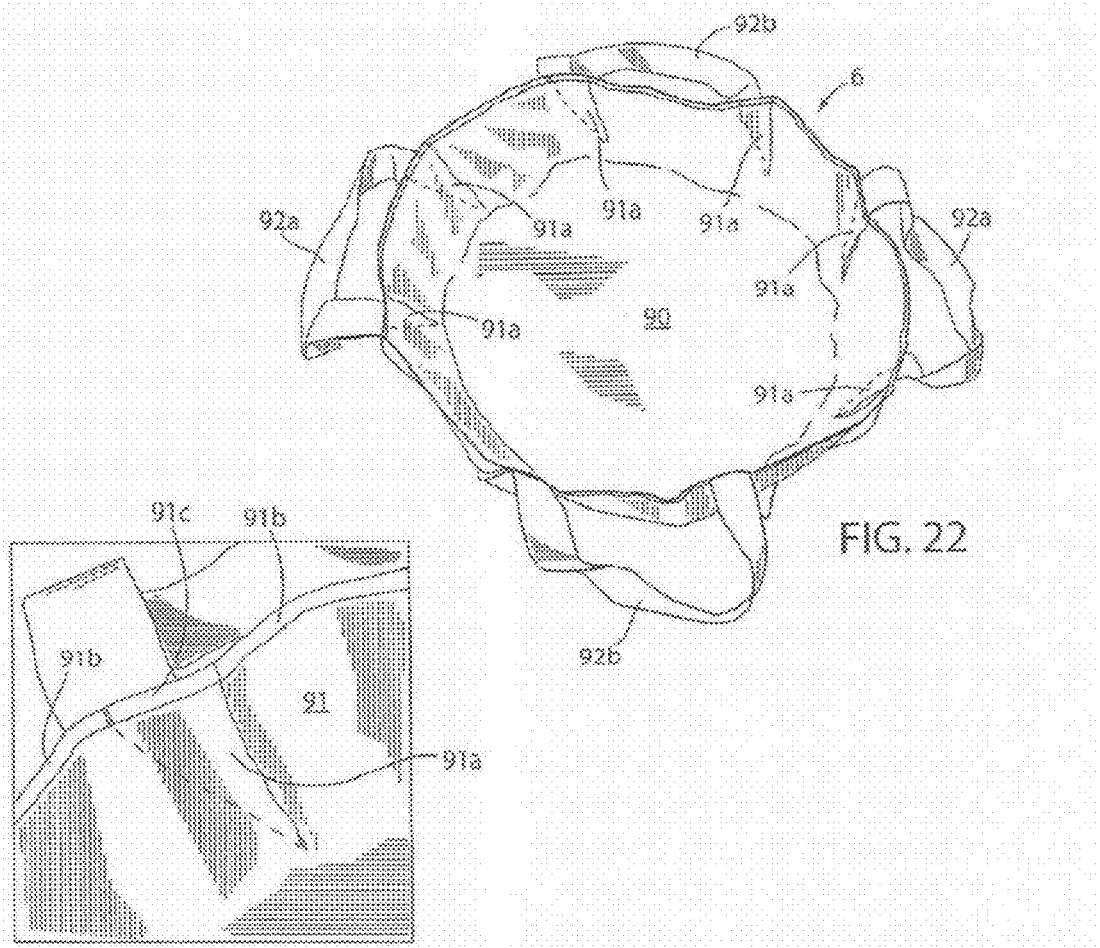
FIG. 22
FIG. 23
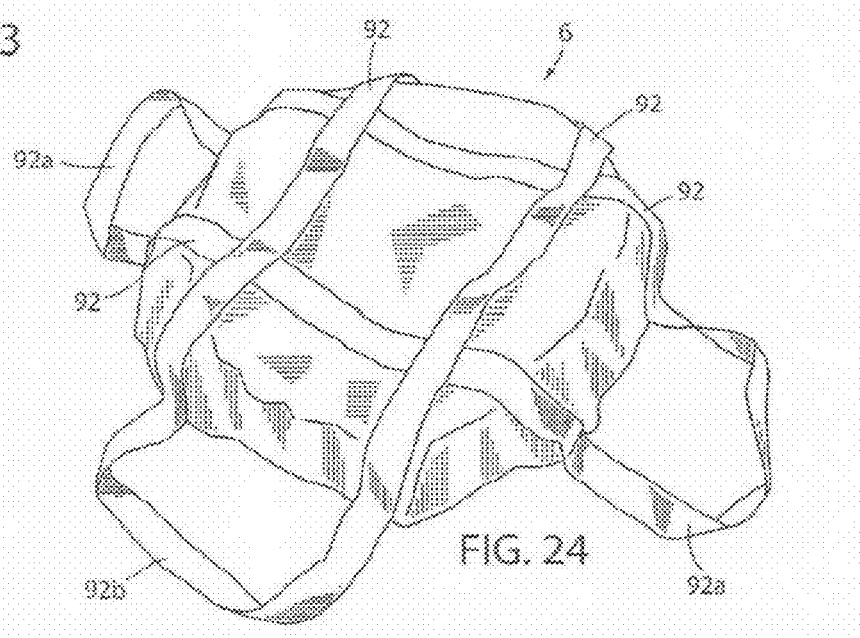
FIG. 24

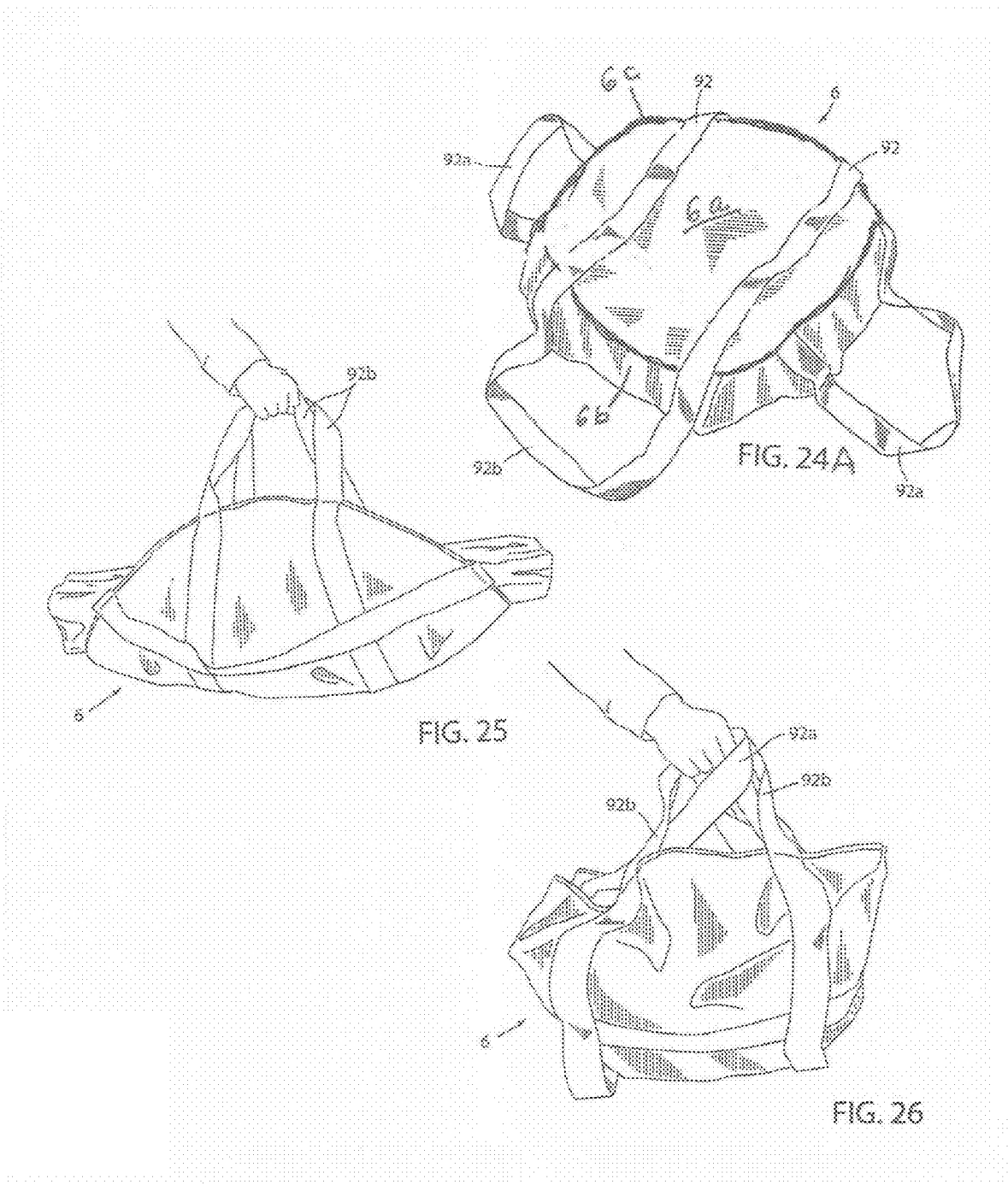

YARD CLEAN-UP TOOLS AND METHODS

CROSS REFERENCE TO RELATED APPLICATIONS

The present application claims the benefit of U.S. Provisional Patent Application No. 61/986,485, entitled YARD CLEAN-UP TOOLS AND METHODS, filed on Apr. 30, 2014, the entire contents of which are incorporated by reference.

FIELD AND BACKGROUND

The present invention relates to yard tools. Such tools include devices and equipment for handling refuse, leaves, trash, and the like.

SUMMARY OF THE INVENTION

In the present invention, knock down yard tools are provided which are made of flexible heavy duty sheet material joined to form a container for handling yard waste. In one embodiment, struts are provided which can be readily assembled to and disassembled from the sheet material to help hold the shape of the container. Preferably the struts are collapsible, and most preferably comprise sections held together and biased to assembly by elastic cord. In a preferred embodiment, a collection of such knock down yard tools are provided along with auxiliary tools for manipulating the yard waste and facilitate its placement in the knock down containers.

In one embodiment, a truck, bed carrier container is configured to include a central bottom wall bounded at one end by an upwardly projecting end wall and bounded on each side by an upwardly extending sidewall; said end wall and said sidewalk being secured together at the ends of said end wall and the adjacent end of each side wall, such that said end wall and said sidewall tend to stand up when said container is seated on the ground. The central bottom wall extends outwardly beyond the ends of said sidewalls to define a front wall portion and a front flap portion which can be folded up and over material placed in said container, the sidewalls continue outwardly to the left and right of said central bottom wall to define top closing side flaps which can be folded over material placed in said carrier, whereby said truck bed carrier container can be filled with material and said front wall and front flap portion and said side flaps can be folded over said material to secure it.

These and other objects, advantages and features of the invention will be more fully understood and appreciated by reference to the appended drawings, description of the preferred embodiment and claims.

BRIEF DESCRIPTION OF THE DRAWINGS

FIG. 3 is a perspective view of a rear corner portion of the container of FIG. 1;

FIG. 4 is a perspective view of the collapsible strut used to help shape the container of FIG. 1;

FIG. 4A is an enlarged fragmentary view of the juncture of separated strut segments, showing the internal flexible resilient cord which runs through the strut segments;

FIG. 5 is a perspective view of a person moving the leaves collected in the container of FIG. 1;

FIG. 16 is a perspective, view of a knock-down leaf press tool;

FIG. 17 is a perspective view of the tool of FIG. 16 being used to press leaves down into a container therefor;

FIG. 18 is a perspective view of the leaf press tool used as a rake or scraper;

FIG. 22 is a perspective view of a carrying bag;

FIG. 23 is a fragmentary perspective view of a portion of the carrying bag of FIG. 22;

FIG. 24 is a perspective bottom view of the carrying bag of FIG. 23;

FIG. 24A is a perspective bottom view of an alternative embodiment of the carrying bag of FIG. 23;

FIG. 25 is a perspective view of the carrying bag being used with two of its handles;

FIG. 26 is a perspective view of the carrying bag being used with all four of its handles;

PREFERRED EMBODIMENTS

Introduction

Figure 19:
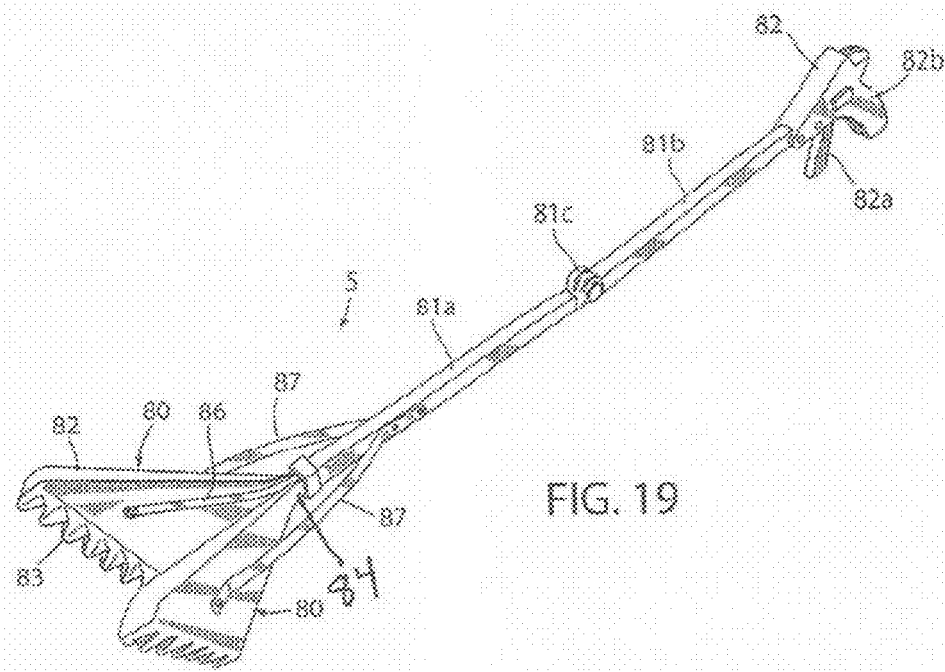
FIG. 19 is a perspective view of a collapsible clamping tool.
Figure 20:
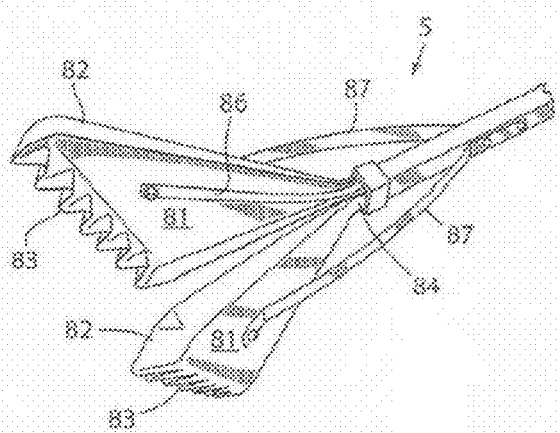
FIG. 20 is a perspective of the clamping end of the clamping tool of FIG. 19.
Figure 21:
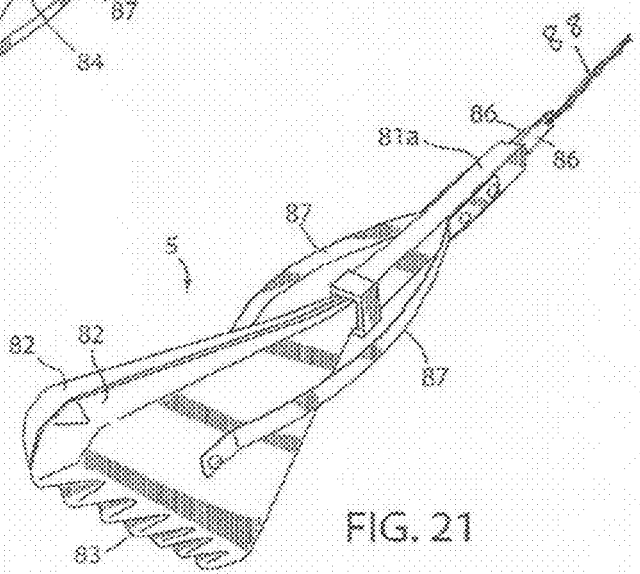
FIG. 21 is a perspective view of the clamping end of the clamping tool with the clamp closed.

In the preferred embodiments, set of knock-down and/or collapsible yard tools are provided which are convenient to use and compact to store. They include:

1. Skid container 1 (FIGS. 1-5);
2. Bagging container 2 (FIGS. 6-12);
3. Hand scoops 3 (FIGS. 13-15);
4. Leaf press 4 (FIGS. 16-18);
5. Gripper 5 (FIGS. 19-21);

6. Carrying bag 6 (FIGS. 22-26)
7. Truck bed carrier container 7 (FIGS. 27-30).

Skid container 1, bagging container 2, carrying bag 6 and truck bed carrier container 7 are all made of a flexible heavy duty sheet material. By "flexible heavy duty sheet material," we mean a material which can be readily folded for storage, but is strong enough to withstand rough usage. Thus skid 1 can be slid over the ground while carrying a load of yard refuse such as leaves, without tearing apart. The material is resistant to poking rupture caused by small branches and the like. Preferably, the material has some stiffness, or "body," such that it tends to hold its shape when unfolded into its "use" configuration. Flexible reinforced plastic sheeting is a preferred material. Preferably, it is reinforced with a non-woven plastic scrim. Thicknesses preferably range from 4-20 mils, more preferably 5-15 mils. 5 mil and 10 mil thicknesses have been found sufficiently durable for most applications.

Skid container 1 and bagging container 2 are also made of detachable collapsible segmented struts 10 (FIG. 4). Each strut 10 is comprised of a plurality of rigid segments 11, preferably held together by flexible elastic cord 12, which biases the segments 11 toward assembly. Flexible elastic cord 12 is threaded through the hollow interior of the strut segments 11 (FIG. 4A). Alternating segments include a sleeve 13 at one end, which receives the end of the adjacent segment 11 when strut 10 is assembled. Each end segment includes a cap 14 on its free end, to facilitate insertion of each end of the assembled strut 10 into receiving pockets on the associated container. Preferably all of the struts for all of the containers have segments of the same length. In the preferred embodiment, the segments are eleven inches in length.

Thus each segmented strut can be easily broken down into a compact collection of joined segments 11, as shown in FIG. 4. It can also be easily assembled into a unified strut by grasping adjacent struts and guiding the free end of one strut 11 into the sleeve 13 at the end of the adjacent strut 11. The elastic cord keeps the strut segments engaged until they are pulled apart and folded relative to one another as shown in FIG. 4.

Skid Container 1 (FIGS. 1-5)

Skid container 1 comprises a bottom 20, a pair of spaced triangular sidewalls 21 and a back wall 22, all made of flexible heavy-duty sheet material as described above (FIGS. 1, 2). Bottom 20 is made of 10 mil thick flexible heavy-duty sheet material while sidewalls 21 and rear wall 22 are made of 5 mil thick material. A strut receiving pocket 21a is located along the front top edge of each sidewall 21, where the front of sidewall 21 meets bottom wall 20. A similar pocket 21b is located at the top edge and opposite end of sidewall 21 where sidewall 21 engages rear wall 22. Three loops 21c are spaced along the top edge of each sidewall 21. In use, an assembled strut 10 is inserted through loops 21c, and one end of each strut is positioned within pocket 21a and the other end within pocket 21b.

Figure 2:
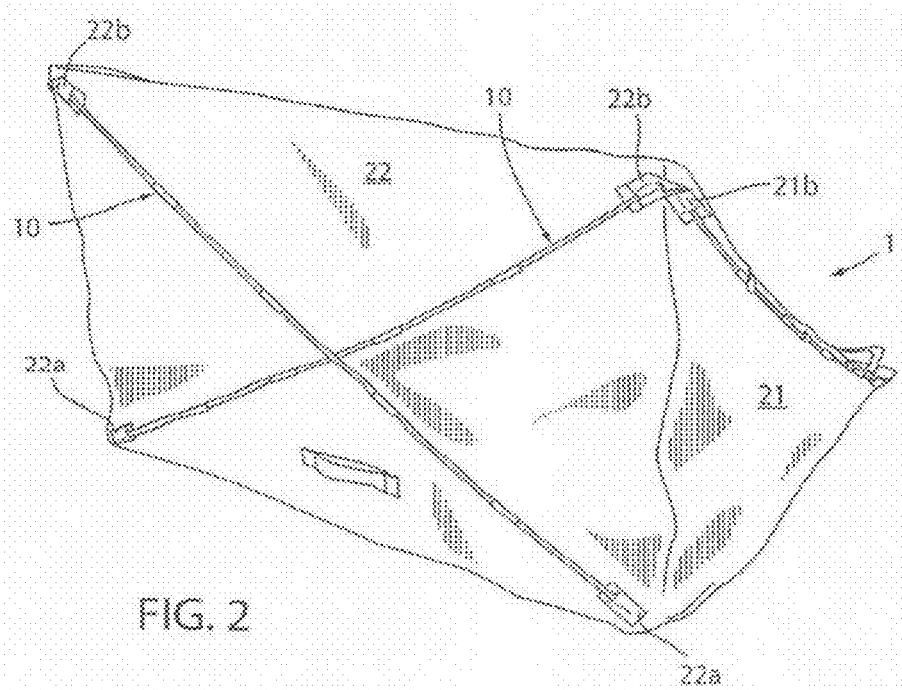
FIG. 2. is a rear perspective view of the container of FIG. 1.

Back wall 22 is supported in use by diagonally arranged struts 10 (FIG. 2). A pocket 22a is located at each lower corner of back wall 22, opening diagonally towards the opposite top corner, for receiving one end of an assembled strut 10. A second pocket 22b is located at the upper corner of back wall 22, opening diagonally towards pocket 21a, for receiving the other end of each strut 10, with the struts 10 being arranged diagonally in an "X" configuration. Preferably, each upper corner back wall pocket 22b and sidewall pocket 21b are made as a unitary member, folded and sewn to each upper corner in the manner shown in FIG. 3.

Figure 1:
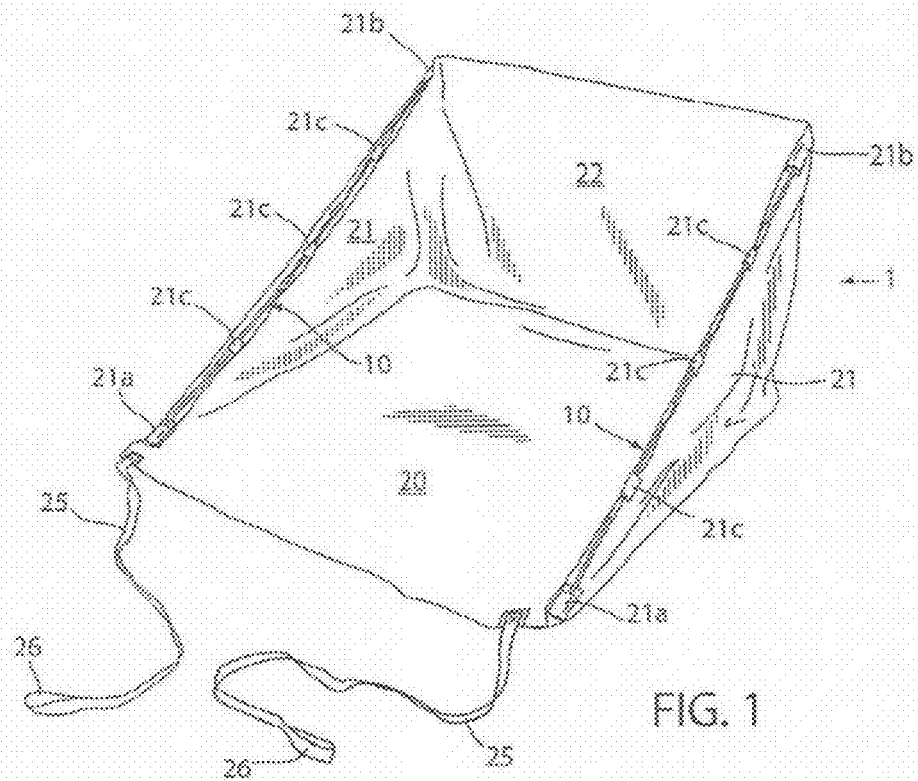
FIG. 1 discloses a front perspective view of a skid container for collecting and hauling yard waste.

Thus in use, assembled struts 10 located, at the top of each triangular shaped sidewall 21 and diagonally arranged struts 10 on the outside of back wall 22 give skid 1 "body" so that it will stand up in the manner shown in FIGS. 1 and 2 while it is being filled with leaves or other lawn refuse. Carrier container 1 includes a handling strap 25 at each front corner of bottom 20, and each strap 25 includes a handhold loop 26 at its free end. By grasping the handholds 26 of straps 25, a user can slide container 1 filled with leaves or other refuse over the ground to a common dumping location, as shown in FIG. 5. Because bottom 20 is flexible and does not include a reinforcing strut across its front, it tends to fold upwardly when container 1 is towed as shown in FIG. 5, thus helping to enclose the load of leaves or other refuse contained in container 1 during transport over the ground.

Skid container 1 is preferably from 3-5' wide between triangular sides 21, 2-4' high at back wall 22 and 2-6' deep from front to back. The preferred embodiment as shown is 4.5' wide, 3' high at back wall 22 and 5' deep from front to back of skid bottom 20. A smaller heavy-duty version for receiving and moving heavier materials might be made of 10 mil thick flexible heavy-duty sheet material on sides 21 and back 22 as well as bottom 10. A smaller container might be more appropriate for carrying heavier material, as for example container 1 configured to be 30" wide from side to side, 2' high at back wall 22 and 32" deep from front to back.

Bagging Container 2 (FIGS. 6-12)

Figure 8:
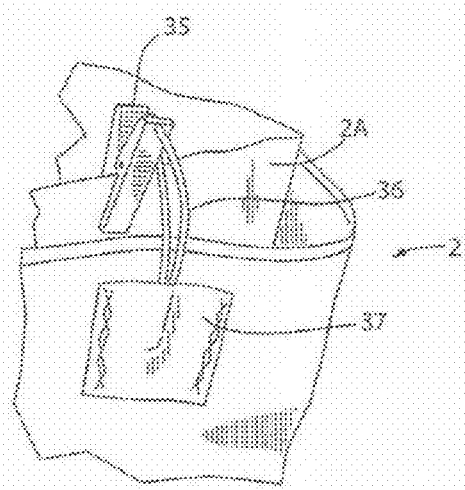
FIG. 8 is a fragmentary perspective view showing an attachment device for securing a bag inside the container of FIG. 6.
Figure 9:
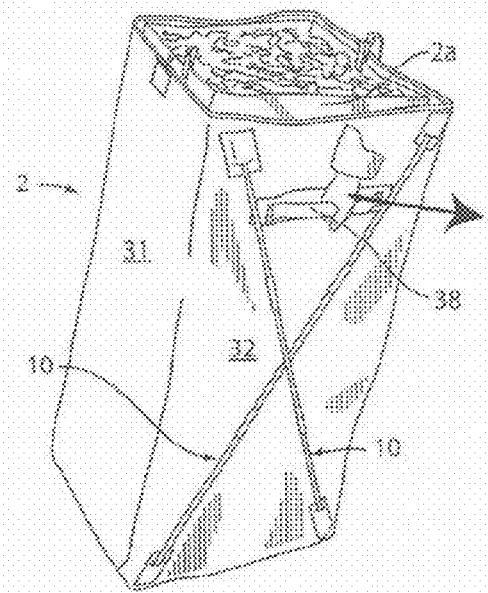
FIG. 9 is a perspective view showing the filled container of FIG. 6 being used to move the yard waste.
Figure 10:
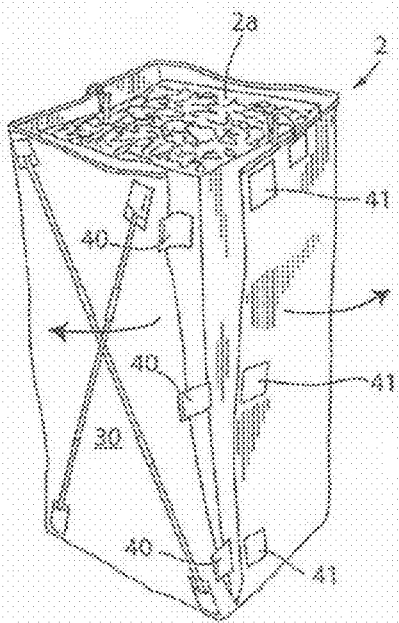
FIG. 10 is a perspective view of the container of FIG. 6 being opened to facilitate removal of a bag of yard waste from the container.

The preferred embodiment bagging container 2 is intended for use in bagging leaves and other yard refuse. Container 2 can be used per se to bag leaves and the like, but preferably is intended tier use in combination with a separate plastic or paper bag 2a (FIGS. 8, 9 and 10). Each bagging container 2 comprises a front wall 30, sidewall 31, rear wall 32 and opposite sidewall 33, preferably formed of a single sheet of said flexible heavy-duty sheet material, joined at its bottom edge to a bottom sheet of said material (not shown). Preferably, all four walls are made of a single piece of said flexible heavy-duty sheet material, approximately 5 mils thick. Said bottom sheet is preferably 10 mils thick. Each said wall is preferably about 10 to 20 inches wide, more preferably about 10-14 inches, and most preferably about 12 inches wide. Preferably, said walls are about 3-4 feet tall, most preferably about 3 feet 8 inches.

Figure 6:
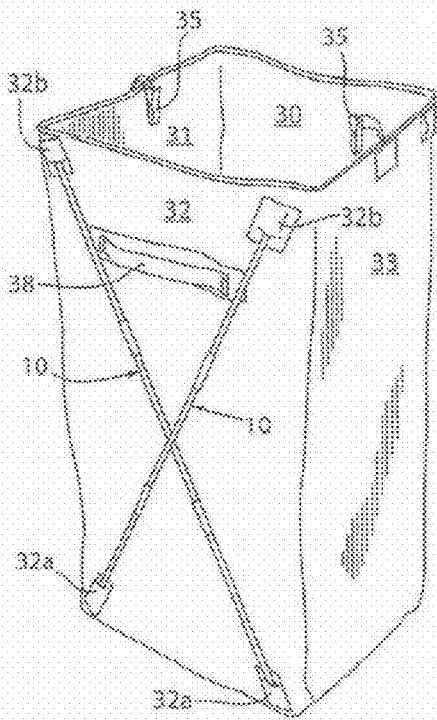
FIG. 6 is a perspective view of an openable and closeable bagging container for holding yard waste.
Figure 7:
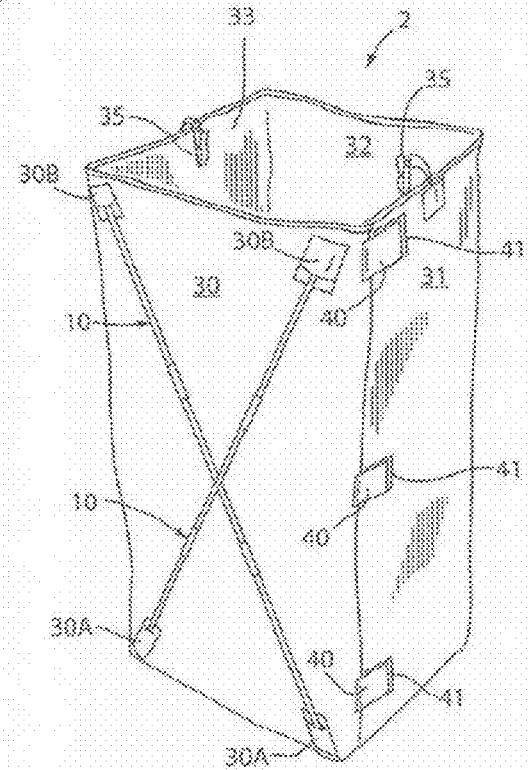
FIG. 7 is a perspective view of the container of FIG. 6 taken from the opposite side shown in FIG. 6.

Front wall 30 includes a pocket 30a at each bottom corner and a similar pocket 30b at each upper corner (FIG. 7). The bottom pockets 30a and the top pockets 30b open diagonally towards their respective opposite lower and upper corners, such that in use, they receive diagonally oriented rigidifying struts 10. In a similar manner, rear wall 32 includes lower corner pockets 32a and upper corner pockets 32b, oriented in a manner corresponding to the corner pockets on front wall 30, such that rear wall 32 can be rigidified by a pair of diagonally disposed struts 10 (FIG. 6).

An alligator clip or similar fastener 35 is tethered to the top of sidewall 31 and 33 via a connector 36 anchored at anchoring patch 37 near the top of each sidewall 31 and 33 respectively (FIGS. 6, 7 and 8). Clips 35 are clipped to the top and opposite sides of bag 2a positioned within bagging container 2, with alligator clip 35 being clipped either just to the top of bag 2a or preferably clipped so as to capture both the top of bag 2a and its respective sidewall 31 or 33 of bagging container 2. This helps hold bag 2a open within bagging container 2. Preferably clips 35 are located on sidewalls 31 and 33 between the rigidified walls 30 and 32, since the rigidified walls 30 and 32 help prevent sidewalk 31 and 33 from caving in towards one another.

The rear wall 32 of bagging container 2 includes a handle 38 secured thereto near its top edge. Handle 38 enables a user to grasp and move bagging container 2 after it or a removable inner bag 2a is filled with leaves as shown in FIG. 9.

Front wall 30 and adjacent sidewall 31 are not permanently connected to one another. Rather, they are provided at or near their adjacent edges with mating fastening devices 40 and 41 which can be used to secure front wall 30 and sidewall 31 together as shown in FIG. 7, or can be disengaged as shown in FIG. 10, thus opening bagging container 2 to facilitate easy removal of leaves contained therein, or of a bag 2a filled with leaves and contained within container 2 (FIG. 10).

Figure 11:
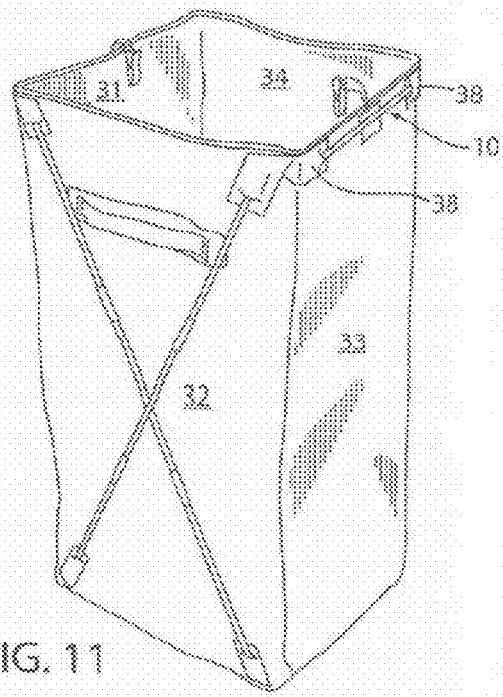
FIG. 11 is a perspective view of an alternative embodiment of the container including lateral struts as well as diagonal struts to help shape the container.
Figure 12:
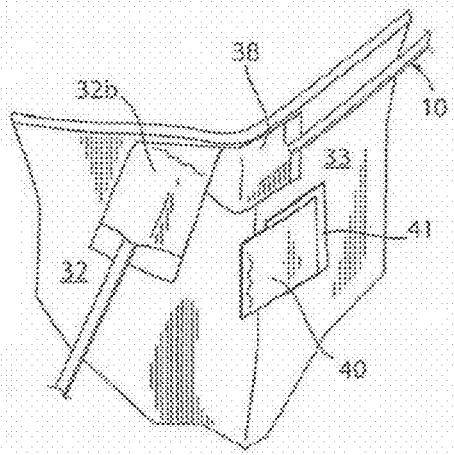
FIG. 12 is a fragmentary perspective view of the upper corner of the container of FIG. 11.

An alternative embodiment bagging container 2 is shown in FIGS. 11 and 12. The only difference between the FIGS. 11 and 12 version and the FIGS. 6-10 version is that the FIGS. 11 and 12 version includes a strut 10 at the top of each sidewall 31 and 33, with its ends positioned it pockets 38 at each upper corner of each sidewall 31 and 33 (FIG. 11). Preferably, each corner pocket 38 is made integral with the adjacent upper corner pocket 30b or 32b, respectively. The integral member is then folded so as to orient the respective receiving pockets 18 to thee laterally inwardly towards one another and pocket 32b to open downwardly and diagonally towards its opposite corner, as shown in FIG. 12.

Figure 13:
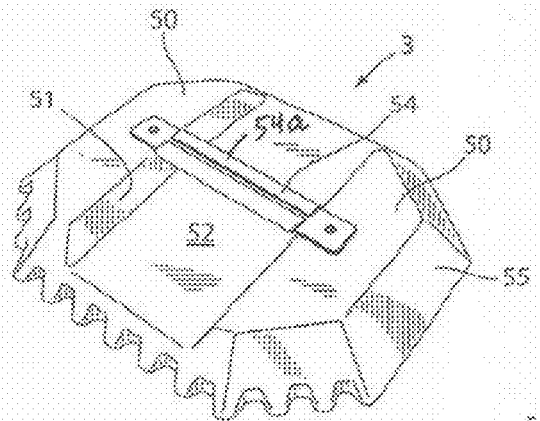
FIG. 13 is a top perspective view of a hand scoop used to facilitate picking up yard waste.
Figure 14:
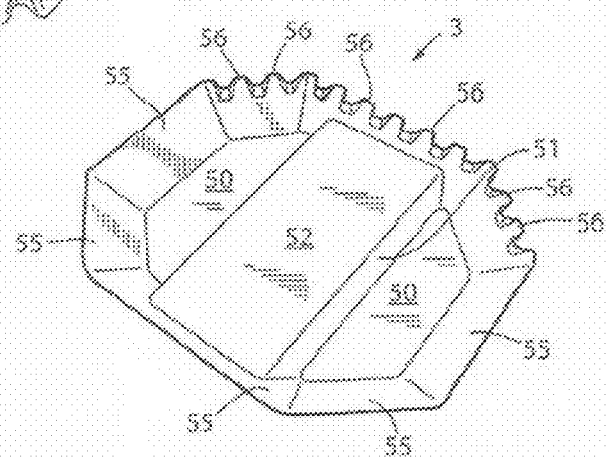
FIG. 14 is a perspective bottom view of the hand scoop of FIG. 13.
Figure 15:
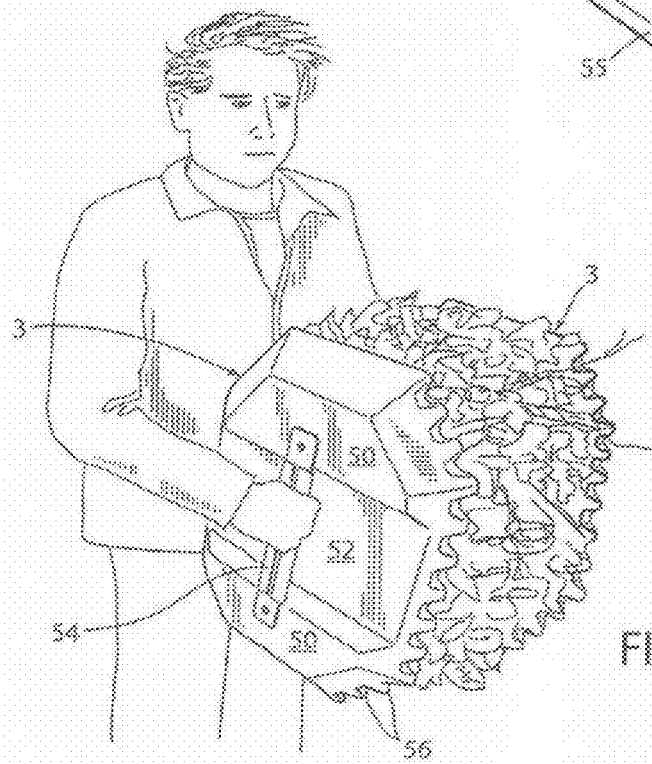
FIG. 15 is a perspective view showing the use of two FIG. 13 hand scoops to scoop up and hold leaves.

Hand Scoops 3 (FIGS. 13-15)

Hand scoops 3 are preferably molded of a durable plastic material so as to have generally the configuration of shallow bowls (FIGS. 13-15). Each scoop 3 comprises two separated top walls 50 joined by downwardly sloping sidewalls 51 to an intermediate top wall 52, located below the level of top walls 50, but above the bottom edge of scoop 3. A handle 54 bridges over intermediate wall 52 and is secured at each end to its respective top wall 50, spaced above intermediate wail sufficiently to allow a user to handle scoop 3 by grasping handles 54, as shown in FIG. 15, with his or her fingers extending into the space between handle 54 and intermediate wall 52. Preferably, handle 54 is slightly flexible to allow some expansion of the space between handle 54 and intermediate wall 52 for accommodating a user with larger hands and/or thicker fingers. Most preferably, handle 54 is a strap handle with a softer cover 54a to allow easier gripping.

An eight sided sidewall 55 slopes downwardly from top walls 50 and intermediate wall 52 to provide depth and the shallow bowl configuration to each scoop 3. The bottom edge of three of the sidewalls 55 located generally at one end of intermediate wall 52 have as bottom edge which is scalloped to define a series of spaced teeth 56. This enables one to use scoop 3 as a hand rake, for raking up debris. The bottom edge of the opposite three side walls 55 is smooth, as is the bottom edge of the end walls 55. This enables the user to use a scoop 3 to scrape up finer debris, such as dirt, off of a sidewalk or driveway. By using one scoop as a dustpan and the other as a rake or scraper, the user can scrape or rake debris into the scoop 3 being used as a dustpan. If the user has raked up a pile of leaves or other debris, the user can pick up a large quantity of leaves or debris by using opposing scoops 3 to clamp the leaves or debris there between. The leaves can then be conveyed to a container such as container 1 or container 2, where the leaves can be deposited.

Preferably, the scoops 3 are between about 10 and 18" in width and 12 and 22" in length, preferably about 14"×17" in length.

Leaf Press 4 (FIGS. 16-18)

In the preferred embodiment, leaf press 4 comprises a molded plastic platen 60 and associated handle 70 (FIGS. 15-18). Platen 60 comprises a bottom plate 61 and a mounting head 62 projecting upwardly therefrom. Bottom plate 61 can be a continuous flat member across the bottom of head 62, or plate 61 can comprise a perimeter plate around the perimeter of the base of mounting head 62, with the interior of head 62 being open at its bottom. Bottom plate 61 extends outwardly to the left and right of mounting head 52 as shown in FIG. 16, and includes three reinforcing ribs 63 on each outwardly extending portion. One of the outwardly extending portions is molded or machined to define teeth 61a along its edge. The opposite side edge 61b is smooth and straight.

Mounting head 62 includes front and back upwardly and inwardly sloping walls 64 and similarly upwardly and inwardly sloping left and right sidewalls 65. Upwardly sloping walls 64 and 65 terminate in a top wall 66. Top wall 66 includes a top opening 67 adapted to receive the end of an elongated handle 70. Preferably, opening 67 is threaded to match threads on the end of upwardly projecting handle 70.

Similarly, each upwardly sloping sidewall includes a handle mounting opening 68 into which handle 70 can be threaded (FIG. 18). Preferably, handle 70 is collapsible or formed of separate sections, such that it can be broken down to a shorter length for storage. By threading handle 70 into upper hole 67 one can conveniently use leaf press 4 to press leaves into a bag 2a or bagging container 2 as shown in FIG. 17. By connecting handle 70 to one of the side openings 68, one can use press 4 as a rake, as shown in FIG. 18. By using the opposite side opening 68, one can use press 4 to scrap up dirt and other finer debris into a pile. However, it should be noted that even with handle 70 secured into top mounting opening 67, press 4 could be oriented for use as a rake or as a scraping device depending on whether teeth 61a are oriented downwardly or smooth edge 61b is oriented downwardly.

Preferably, platen 60 is configured to be just slightly smaller in area than the area of the top opening in bagging container 2, such that it can be conveniently used to press leaves and other debris down into a bag 2a positioned in bagging container 2, or down into bagging container 2 itself.

Grippers (FIGS. 19-21)

Gripper 5 allows a user to pick up debris without bending over. Gripper 5 comprises a pair of opposed claim shell gripping members 80, an elongated collapsible handle 81 and a trigger handle 82. Handle 81 comprises two (or more) hollow tubular members 81a and 81b, hingedly joined at a hinge 81c. Hinge 81c is provided, with a releasable detent which holds segments 81a and b) in a straight line as shown in FIG. 19, but can be released to allow the segments to be folded onto one another.

Gripping members 80 are referred to as claim shell damping members because they have opposing recessed, hollow interiors, each defined by a back wall 81 and downwardly (or upwardly depending on orientation) extending sidewalls 82 and a downwardly extending elongated bottom wall 83 (FIGS. 19-21). Preferably bottom wall 83 is formed with teeth, as shown. Each clam shell gripping member 80 includes a flexible hinge 84 which extends upwardly into the interior of hollow elongated handle 81. Secured to the inside of each back wall 81 of each claim shell member 80 is a strap 86, preferably a metal strap, which also extends upwardly into the interior of the bottom segment 81a of handle 81. The end of each strap 86 is connected by a cable 88 to the trigger 82a of handle grip 82

(see FIGS. 19, 21). When a user pulls trigger 82a back towards handle grip 82b, one draws cable 88 upwardly, thus pulling straps 86 upwardly, and pulling claim shell members 80 towards one another into a closed position as shown in FIG. 21. A leaf spring 87 is secured to the outside of claim shell back wall 81 by the same fastener that secures inner strap 86, and is secured at its other end to the lower segment 81a of elongated handle 81. Leaf springs 87 are biased to pull claim shell members 80 outwardly and open with respect to one another when trigger 82a is released. Thus, leaf springs 87 maintain claim shells 81 in a normally open position as shown in FIGS. 19 and 20.

Preferably, the opposed elongated bottom walls 83 are oriented at an inside angle of about 45-75 degrees with respect to handle 81, more preferably about 55-65 degrees, and most preferably about 60 degrees, such that clam shell gripping members are located out in front of the user when held against the ground or other surface from which debris is being removed. Bottom edges 83 are preferably about 4-8 inches long, more preferably 5-7 inches long, and most preferably about 6 inches long. The perpendicular distance from bottom edge 83 to hinge portion 84 is from about 2 to 6 inches, more preferably y about 3-5 inches, and most preferably about 4 inched.

Because of the claim shell configuration of gripping members 80, small debris can be picked up and held between gripping members 80 when the claim shells are closed on one another. Because of the elongated bottom edges 83, it is easier to pick up larger refuse members than can be done with a typical gripper having opposed narrow facing gripping members.

Carrying Bag 6 (FIGS. 22-26)

Carrying bag 6 is made of the flexible heavy-duty sheet material described above, shaped in such a way as to have the configuration of a shallow bowl (FIGS. 22,24). Thus, the heavy-duty flexible sheet material is configured to have a bottom 90 and an upturned and slightly outwardly directed perimeter sidewall 91. In the preferred embodiment, this configuration is accomplished by folding, the perimeter portion 91 of the sheet material, back on itself in a triangular manner (91a) at multiple points around perimeter sidewall portion 91. In the preferred embodiment shown, there are eight such folds. These triangular folds 91a are either sealed together or secured by folding the material over along the perimeter edge to form an edge hem 91b, and then sealing the hem, as for example by stitching. The hem is labeled 91c at the top of each triangular fold 91a, where it is slightly thicker because of the extra material of the fold (FIG. 23).

Carrying bag 6 is preferably made of 10 mil thick sheet material. It is further reinforced by a pair of elongated loops of strapping 92 secured across the bottom 90 of carrying bag 6 in crisscrossed, perpendicular manner with respect to one another. These reinforcing straps also define upwardly extending handles 92a at the ends of one of the straps 92 and 92b at the ends of the other of the straps 92.

In an alternative embodiment. Carrying bag, 6 is made in two pieces, a bottom 6a and a sidewall 6b, both made of said 10 mil thick material (FIG. 24A). Bottom 6a is preferably round or oval. Sidewall 6b is a long rectangular strip of said material, attached to the perimeter of bottom 6a at seam 6c. The ends of the sidewall piece are secured to each other, preferably so as to give sidewall 6b a slight outward flare when carrying bag 6 is seated on the ground. Further, handle straps 92a are shorter, with the end portions of each strap being secured to opposite sides of sidewall 6b.

When placed on the ground or other support surface, carrying bag 6 will tend to seat itself as shown in FIG. 22, with its open dish configuration ready to receive objects to be carried. Heavy objects can be placed into the open dish and can be carried either by grasping two of the opposed handles, such as handles 92b, or all four of the opposed handles 92a and 92b (see FIGS. 25, 26). In FIG. 25. bag 6 is being used to carry a log or other piece of wood, using only two of the opposed handle straps 92b. In FIG. 26, carrying bag 6 is being used to can stones, dirt or the like, such that it is better to grasp all four of the handles and thereby close the bag up more securely on all sides.

Truck Bed Carrier Container 7 (FIGS. 27-30)

The preferred embodiment truck bed carrier container 7 is formed of the heavy-duty flexible sheet material described above, configured to include a central bottom wall bounded at one end by an upwardly projecting end wall 101 and bounded on each side by an upwardly extending sidewall 102. The end wall 101 and sidewalls 102 tend to stand up when container 7 is seated on the ground, because the sidewalls 1 and 2 and end wall 101 are secured together, and because of the "body" which the flexible heavy duty sheet material has. End wall 101 could also be provided with pockets for receiving rigidifying struts 10 in a manner similar to that used for rigidifying the back wall 22 of container 1 (FIG. 2). The sheet of material defining central bottom wall 100 extends outwardly beyond the ends of sidewalls 102 to define a front flap including what will become a front wall portion 100a and a front closing flap portion 100b after container 7 is filled and one is prepared to close it up. Similarly, sidewalls 102 continue outwardly to the left and right to define top closing flaps 102a. Rear wall 101 extends outwardly to define a rear closing flap 101a.

Figure 27:
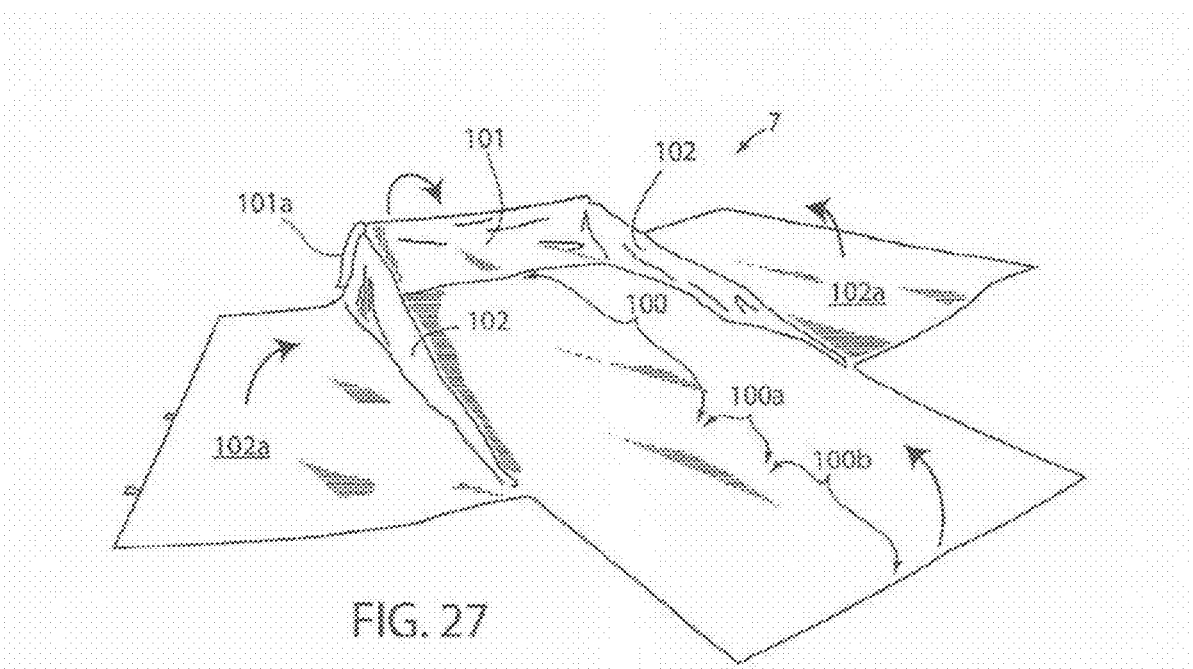
FIG. 27 is a perspective view of a truck bed container.
Figure 28:
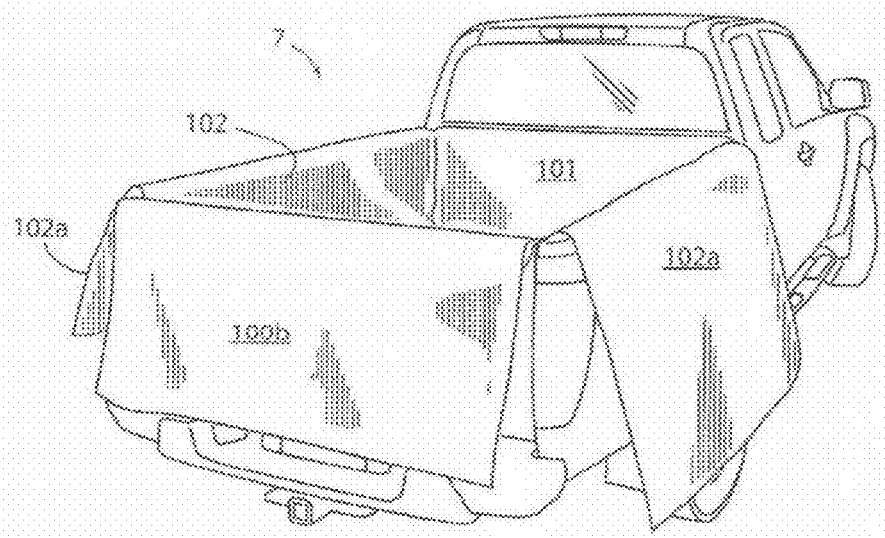
FIG. 28 is a perspective view of the truck, bed container shown in a pickup truck bed.

Truck bed container 7 can be filled with refuse while seated on the ground, as shown in FIG. 27. Alternatively, it can be placed in the bed of a pickup truck such that back wall 101, sidewalls 102 and the front wall portion 100a are supported by the front, sides and closed tailgate of the pickup truck bed, as shown in FIG. 28. Top closing flaps 102a and top closing flap 100b hang over the edges of the truck bed in the manner shown. Rear closing flap 101a cannot be seen, but it is folded down behind front wall 101.

Figure 29:
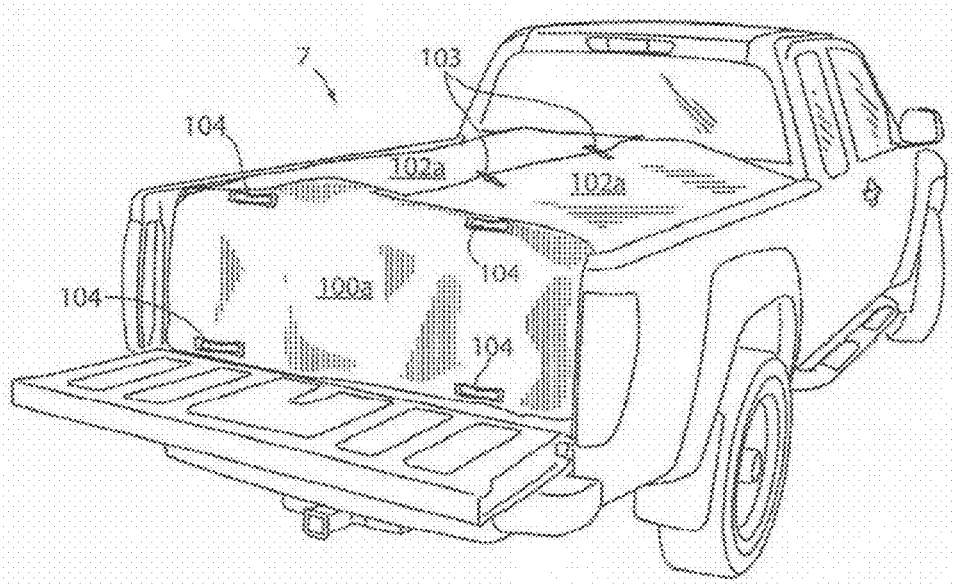
FIG. 29 is a perspective view of the closed truck bed container in a truck bed.
Figure 30:
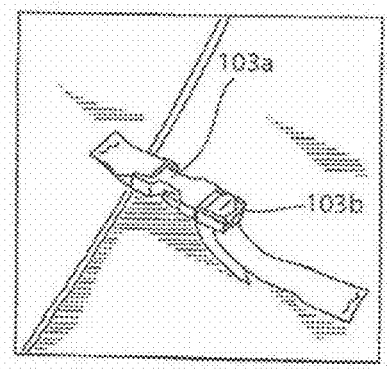
FIG. 30 is a perspective view of a closure device on said truck bed container.

In either use, once truck bed container 7 is filled, flap 100b and flap 101a are folded up and over the top of the load, and flaps 102a are then folded up and over the top of the load and flaps 101a and 100b (see FIG. 29). Flaps 102a include mating connectors 103a and 103b secured to their adjacent overlapping edges so that flaps 102a can be securely closed and locked in position over the top of the load being conveyed in the truck. The exposed side of flap portion 100a when flap 100a and 100b is wrapped into its closed position include handles 104 located near the top and bottom edges of flap portion 100a. This makes it convenient for one to place the filled container 7 into and/or removing it out of the truck bed. The ability to lift the loaded container 7 into the truck bed is enhanced by placing handles 104 on the outside of back wall 101, and/or onto the outside of side walls 102. Removing the filled container 7 from the truck bed. is accomplished by grasping one or two of the handles 104 on wall 100a and pulling the entire filled container 7 out of the truck bed when the tailgate is lowered as shown in FIG. 29. With the carrier 7 out of the truck bed, attaching members 103a and 103b can be disengaged, the respective flaps opened and the contained load readily disposed of.

Exemplary use of the Yard Tool Collection

In use, skid container 1 can be unfolded and set up by erecting braces 10 and securing them in the positions shown in FIGS. 1 and 2. The erected skit container 1 can be positioned at a convenient location in the yard as shown in FIGS. and 2. Leaves or the like can be raked or blown into convenient piles, or directly into the open from of skid container 1. Piles of loose leaves which were not readily raked or blown directly into skid container 1 can be readily picked up by using opposing hand scoops 3 in the manner shown in FIG. 15. The leaves or other waste materials so scooped up can be conveyed to and dumped into the opened top of skid container 1.

Once skid container 1 is filled with leaves or other wastage, it can be slid (skidded) over the ground in the manner shown in FIG. 5 to a composite pile, burn pile or perhaps to a truck bed container 7 lying open on the ground as shown in FIG. 27 or lying open in a pickup truck bed with the lift gate down. The waste material is transferred from skid container 1 to truck bed container 7. Similarly, leaves in skid container 1 could be transferred into a paper or plastic bag 2a positioned in erected bagging container 2 using opposing hand scoops 3 in the manner shown in FIG. 15. Leaf press 70 can be used to press the leaves down into bag 2a within bagging container 2 to provide for a more compact load. Leaf press 4 can then be conveniently used as a rake to rake up stray leaves in the area in tray convenient pile for depositing into a bag to a bagging container 2. Alternatively, the smooth edge 61b of leaf press platen 60 can be oriented downwardly to scrap up dirt for disposal, perhaps into bag 2a in bagging container 2.

Bagging container 2 can be dragged to a disposal location using handle 38 in the manner shown in FIG. 9. Bagging container 2 can be opened by unlatching latch members 40 and 41, thereby making it easy to remove a leaf and refuse containing bag 2a for placement at the roadside or some other convenient pickup point, or possibly for placing in the back of a pickup truck or the like.

Carrying bag 90 can be conveniently used to carry larger more bulky objects of refuse such as small branches, rocks, chunks of concrete or the like. The objects can be placed in the open dish-like container placed on the ground as shown in FIG. 22, and container 6 can be closed around the objects by grasping either two or all four of the opposing handles as shown in FIG. 25 or 26. This refuse can then be conveyed to a burn pile, composting pile, or possibly to a truck bed container 7 for disposal in the manner discussed above.

Clam shell gripping member 5 can be conveniently used to pick up miscellaneous objects of refuse around the yard, without having to bend over each time. By dragging bagging container 2 or skid container 1 with son while going around the yard with gripper 5, one can readily pick up refuse with gripper 5 and release it into a container 1 or 2.

Once the yard work is completed, the various yard tools of the present invention can be conveniently knocked down, collapsed, and/or folded up, and stored and a very small space. The rigidifying struts 10 are removed from containers 1 and 2 and collapsed into a connected collection of strut segments approximately 11" to 1' long, as shown in FIG. 4. Containers 1 and 2 can then be folded up for storage on a shelf Similarly, carrying container 6 and truck bed container 7 can be folded up into a compact bundle. Elongated handle 70 can be disassembled from press platen 60 of leaf tamper 4 and conveniently stored on a shelf Preferably, handle 70 is itself hingedly collapsible in the manner of elongated handle 81 of gripper 5, or otherwise separable for storage in a compact space.

In one aspect of the preferred embodiment, bagging container 2 can be left assembled, with the open edges of sides 30 and 31 close together by re-latching attachment members 40 and 41. The now empty interior of bagging container 2 can be filled with the folded up heavy-duty sheet material of containers 1, 6 and 7. Similarly, hand scoops 3 can be placed in the open interior along with the platen ends 60 of leaf presses 4, and folded up handle 70. Gripper 5 can similarly be collapsed around hinge 81c and the collapsed gripper conveniently placed into the interior of bagging container 2. In this way, all of the yard tools of the preferred embodiment can be collapsed, folded up and stored within the interior of bagging container 2. Since the footprint of bagging container 2 is only about 1 sq. foot, the entire collection of yard tools including bagging container 2 can be conveniently stored in a corner of the garage or shed. When it is time to use the tools again, they can be conveniently removed from bagging, container 2 by unlatching attachment members 40 and 41, opening the gap between the edges of sidewall 31 and front wall 30, and conveniently removing the various tools for reassembly and use.

Of course it is understood that the foregoing is a description of the preferred embodiments of the invention and that various changes and alterations can be made to the preferred embodiments without departing from the spirit of the invention.

The invention claimed is:
1. A truck bed carrier container for enclosing a load to be carried in said truck bed, comprising: flexible sheet material comprising a central bottom wall bounded at one end by an upwardly projecting end wall and bounded on each side by an upwardly extending sidewall; said end wall and said sidewalls being permanently secured together such that said end wall and said sidewalls tend to stand up when said container is seated on a supporting surface; said end wall extending outwardly to define a rear closing flap which can be folded up and over a load carried in said truck bed carrier container; said side walls extending forwardly from said end wall and terminating at sidewall forward ends; said central bottom wall extending outwardly beyond said sidewall forward ends to define a front flap having a front wall portion and a front closing flap portion which can be folded up and over a load placed in said container; said front wall portion and said sidewalls being unsecured to one another to facilitate loading and unloading a load into and from said truck bed carrier container; said sidewalls continuing outwardly to the left and right of said central bottom wall to define top closing side flaps which can be folded over a load placed in said truck bed carrier container, whereby said truck bed carrier container can be filled with a load and said front flap, said rear closing flap, and said side flaps can be folded over said load to secure it; said sidewall top closing flaps extending outwardly sufficiently far as to overlap when folded over a load, said sidewall top closing flaps including mating connectors secured to their adjacent overlapping portions so that said sidewall top closing flaps can be securely closed and locked in position over said rear closing flap and front closing flap portion and a load being conveyed in said truck bed carrier container; said front wall portion of said front flap including at least one handle which is accessible when said front flap is folded up and over a load, making it convenient for one to handle said truck bed carrier container when filled with a load, and to facilitate removing said loaded truck bed carrier container from a truck bed.

2. The truck bed carrier container of claim 1 comprising: at least two of said handles on said front wall portion of said front flap, spaced from one another.

3. The truck bed carrier container of claim 1 in which said rear closing flap includes at least one handle which is accessible when said rear closing flap is folded up and over a load placed in said truck bed carrier container, making it convenient for one to handle said carrier when filled with a load, and to facilitate removing said loaded truck bed carrier from a truck bed.

4. The truck bed carrier container of claim 3 in which at least one handle is located on the outside of each said side wall of said container.

5. The truck bed carrier container of claim 1 in which said end wall includes pockets for receiving rigidifying struts placed therein.

6. A truck bed carrier container for enclosing a load to be carried in said truck bed, comprising: flexible sheet material comprising a central bottom wall bounded at one end by an upwardly projecting end wall and bounded on each side by an upwardly extending sidewall; said end wall and said sidewalls being permanently secured together such that said end wall and said sidewall tend to stand up when said container is seated on a supporting surface; said end wall including pockets for receiving rigidifying struts placed therein; said end wall extending outwardly to define a rear closing flap which can be folded up and over a load carried in said truck bed carrier container; said side walls extending forwardly from said end wall and terminating at sidewall forward ends; said central bottom wall extending outwardly beyond said front ends of said sidewalls to define a front flap having a front wall portion and a front closing flap portion which can be folded up and over a load placed in said container; said front wall portion and said sidewalls being unsecured to one another to facilitate loading and unloading a load into and from said truck bed carrier container; said sidewalls continuing outwardly to the left and right of said central bottom wall to define sidewall top closing side flaps which can be folded over a load placed in said truck bed carrier container, whereby said truck bed carrier container can be filled with a load and said front flap and said sidewall top flaps can be folded over said load to secure said load.

* * * * *